(12) United States Patent  (10) Patent No.: US 9,411,211 B2
Ohara  (45) Date of Patent: Aug. 9, 2016

(54) IMAGE CAPTURING APPARATUS AND IMAGING METHOD

(71) Applicant: CANON KABUSHIKI KAISHA, Tokyo (JP)

(72) Inventor: Naoyuki Ohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/696,282

(22) Filed: Apr. 24, 2015

(65) Prior Publication Data

US 2015/0319356 A1  Nov. 5, 2015

(30) Foreign Application Priority Data

Apr. 30, 2014 (JP) .................................. 2014-093891

(51) Int. Cl.
| | |
|---|---|
| *G03B 13/36* | (2006.01) |
| *H04N 5/232* | (2006.01) |
| *H04N 5/369* | (2011.01) |
| *G02B 7/34* | (2006.01) |

(52) U.S. Cl.
CPC ........ *G03B 13/36* (2013.01); *G02B 7/34* (2013.01); *H04N 5/232* (2013.01); *H04N 5/23212* (2013.01); *H04N 5/369* (2013.01); *H04N 5/3696* (2013.01)

(58) Field of Classification Search
CPC ... H04N 5/23212; H04N 5/3696; G03B 13/36
See application file for complete search history.

(56) References Cited

U.S. PATENT DOCUMENTS

| | | | |
|---|---|---|---|
| 8,988,595 B2 * | 3/2015 | Kunieda ............. | H04N 5/23212 348/222.1 |
| 2015/0296129 A1 * | 10/2015 | Ishikawa .............. | H04N 5/3696 348/349 |
| 2016/0080634 A1 * | 3/2016 | Hamano ................. | G02B 7/365 348/349 |

FOREIGN PATENT DOCUMENTS

| | | | |
|---|---|---|---|
| JP | 2001-305415 A | 10/2001 |
| JP | 2010-271419 A | 12/2010 |
| JP | 2013-072906 A | 4/2013 |

\* cited by examiner

*Primary Examiner* — Tuan Ho
(74) *Attorney, Agent, or Firm* — Canon USA Inc. IP Division

(57) ABSTRACT

An image capturing apparatus includes an image sensor having focus detection pixels arrayed in pixel lines, and controls a ratio of pixel line addition to signal correlation amount addition in a focus detection region in accordance with subject information to perform focus detection with increased resolution and suppressed noise based on an image signal of a subject slanting in relation to the focus detection region.

10 Claims, 13 Drawing Sheets

IMAGE CAPTURING APPARATUS AND IMAGING METHOD

BACKGROUND OF THE INVENTION

1. Field of the Invention

The present invention relates to an image capturing apparatus, such as a digital still camera and a video camera, and in particular relates to an image capturing apparatus having an automatic focus adjusting function of an imaging-plane phase difference type.

2. Description of the Related Art

One type of autofocus (AF) employed for an image capturing apparatus, such as a camera, is phase-difference detection (hereinafter referred to as "phase difference AF"). The phase difference AF technique involves dividing a light beam passing through an exit pupil of the photographic lens into two light beams; these divided light beams are then received by a pair of focus detection sensors.

An amount of difference between signals output in accordance with the amount of received light by each sensor, i.e. the relative positional displacement amount in the dividing direction of the light beams (hereinafter referred to as the image displacement amount), is detected (determined) in order to obtain a defocus amount in a focusing direction of the photographic lens.

Japanese Patent Application Laid-Open No. 2001-305415 (JP 2001-305415) discloses a configuration that imparts a phase difference detecting function to an image sensor to thereby eliminate the need for a special focus detection sensor and achieve high-speed phase difference AF.

In JP 2001-305415, the photoelectric converter of a pixel in the image sensor is divided into two sections to provide a pupil-dividing function. The outputs of the two photoelectric converter sections are processed individually to detect the focus, and the sum of the outputs of the two photoelectric converter sections is used as an image signal.

Japanese Patent Application Laid-Open No. 2010-271419 discloses a configuration that reduces the effect of noise for a dark subject during focus detection performed by photoelectric converters having the pupil-dividing function. This configuration detects brightness per line in an image sensor, and performs line addition if the detected brightness is lower than a preset brightness.

Japanese Patent Application Laid-Open No. 2013-072906 discloses a technique to suppress variation in the results of the focus detection performed by photoelectric converters having the pupil-dividing function. For this purpose, a correlation calculation per line in an image sensor is performed for a plurality of lines in the image sensor and the resultant correlation amounts are added.

In the configuration described in Japanese Patent Application Laid-Open No. 2001-305415, the focus detecting function and the imaging function are both performed on the image sensor. Thus, this technique poses a challenge in that, since the exposure setting value for controlling the image sensor is determined in accordance with the imaging, this setting value is not suitable for the focus detection, which results in variability in the results of the focus detection.

The configuration described in Japanese Patent Application Laid-Open No. 2010-271419 reduces noise in image signals used for the focus detection by performing the line addition on the basis of image signals; however, it fails to take into account the reduction in resolution in a longitudinal direction of the subject due to the line addition.

The configuration described in Japanese Patent Application Laid-Open No. 2013-072906 needs to repeat the correlation calculation in order to suppress the variation in the results of the focus detection when a subject has no contrast or when noise in image signals is significant. This may result in an increase in the duration of the calculation.

SUMMARY OF THE INVENTION

As a solution to the above-described issues, the present invention provides a high-precision image capturing apparatus that suppresses noise in an image signal, minimizes reduction in resolution in a longitudinal direction, and reduces the duration of the calculation for focus detection performed with an image sensor including photoelectric converters having a pupil-dividing function. An imaging method related to the apparatus is also disclosed.

According to at least one embodiment, an image capturing apparatus includes: an image sensor including focus detection pixels each including photoelectric converters that receive a pair of light beams that have passed through different pupil regions in an imaging optical system; a focus adjustment unit configured to perform focus adjustment of a phase difference type by using focus detection signals output from the image sensor; a pixel addition unit configured to add focus detection signals output per line from at least one focus detection pixel line of the focus detection pixels of the image sensor, the at least one focus detection pixel line being arrayed in a first direction, the pixel addition unit being configured to add the focus detection signals in a second direction that is different from the first direction; a correlation amount calculation unit configured to perform correlation calculation on the focus detection signals added in the second direction to obtain a correlation waveform value; a correlation amount addition unit configured to add correlation waveform values calculated by the correlation amount calculation unit; an addition ratio change unit configured to change the number of focus detection pixel lines to be subjected to the addition in the second direction and change the number of correlation waveform values, based on information about a subject, the number of correlation waveform values being greater than one; and an image displacement amount calculation unit configured to calculate an image displacement amount by using an output signal output from the correlation amount addition unit.

Further features of the present invention will become apparent from the following description of exemplary embodiments with reference to the attached drawings.

DESCRIPTION OF THE EMBODIMENTS

Figure 1:
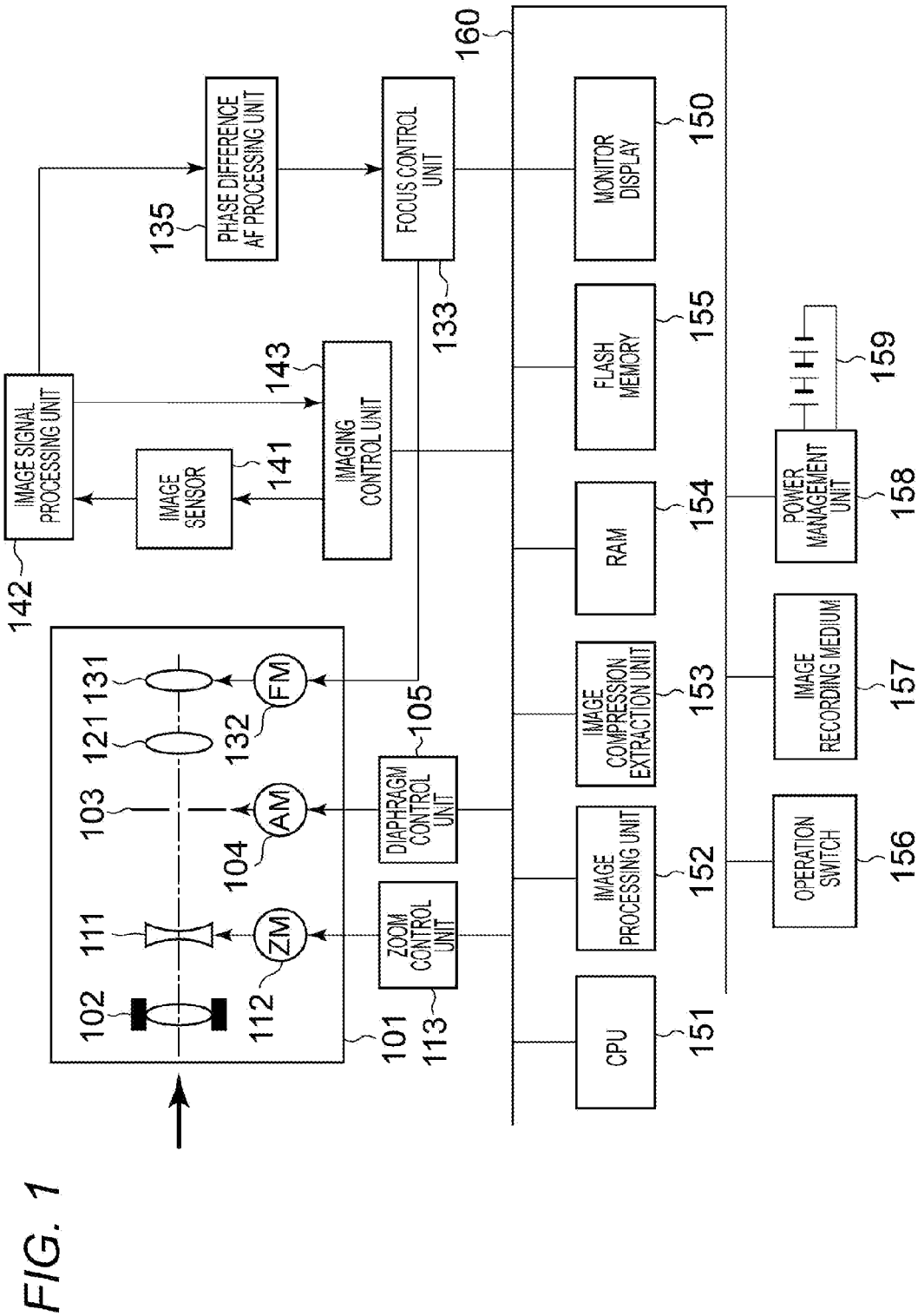
FIG. 1 is a block diagram illustrating an exemplary configuration of an image capturing apparatus according to an embodiment.

Exemplary embodiments of the present invention will be described in detail below with reference to the drawings. Similar components are designated with similar reference signs in the drawings, and their descriptions are not repeated.

First Embodiment

The configuration of an image capturing apparatus according to the present embodiment will now be described with reference to FIG. 1. FIG. 1 is a block diagram illustrating the configuration of an image capturing apparatus 100.

The image capturing apparatus 100 may be, but not limited to, a video camera or a digital still camera that captures an image of a subject and has the capability of storing moving image data and/or still image data in various media, such as a tape, a solid-state memory, an optical disk, and a magnetic disk.

The units included in the image capturing apparatus 100 are connected via a bus 160. These units are controlled by a main CPU 151 (central processing unit).

The image capturing apparatus 100 employs a focus detection device that performs focus detection of a phase-difference type by using an image sensor including photoelectric conversion elements (a first photoelectric conversion element and a second photoelectric conversion element) that share one micro lens.

The image sensor includes focus detection pixels each including the photoelectric converters which receive a pair of light beams that have passed through different pupil regions in an imaging optical system.

The focus detection device according to the embodiment is applied to an imaging system including the image capturing apparatus and the imaging optical system. The image capturing apparatus (the main body of the image capturing apparatus) is configured to acquire an optical image obtained through the imaging optical system (photographic lens), and the imaging optical system is detachable from the main body of the image capturing apparatus.

Note that the embodiment is not limited thereto and that the focus detection device may be also applied to an image capturing apparatus with an integrated imaging optical system.

A photographic lens 101 (lens unit) includes a fixed group-one lens 102, a zoom lens 111, a diaphragm 103, a fixed group-three lens 121, and a focus lens 131.

A diaphragm control unit 105 enables a diaphragm motor 104 to drive the diaphragm 103 according to a command of the main CPU 151 to adjust the aperture diameter of the diaphragm 103 and thereby adjust the amount of light for capturing images.

A zoom control unit 113 enables a zoom motor 112 to drive the zoom lens 111 to thereby change the focal length. A focus control unit 133 enables a focus motor 132 to drive the focus lens 131 to thereby control the focus adjustment.

Although the focus lens 131, which is for the focus adjustment, is illustrated as a single lens in FIG. 1 for simplification, it typically includes a plurality of lenses.

Through these optical components (the photographic lens 101), a subject image is formed on an image sensor 141 and converted by the image sensor 141 to electrical signals. The image sensor 141 includes photoelectric conversion elements that perform the photoelectric conversion from the subject image (optical image) to electrical signals.

The image sensor 141 includes the focus detection pixels, the number of which is m in a width direction and n in a length direction. The focus detection pixels each includes a light receiving element, and two photoelectric conversion elements (two light-receiving areas) disposed in each light receiving element as described hereinafter in more detail. The image formed on the image sensor 141 and subjected to the photoelectric conversion is arranged as image signals (image data) by an imaging signal processing unit 142.

A phase difference AF processing unit 135 uses image signals (signal values) output individually (independently from each other) by the two photoelectric conversion elements (the first photoelectric conversion element and the second photoelectric conversion element) to detect (calculate) the image displacement amount in a dividing direction of the images obtained by dividing the light from a subject.

In other words, the phase difference AF processing unit 135 is an image displacement amount calculation unit that performs correlation calculation with signal values obtained independently from the first photoelectric conversion element and the second photoelectric conversion element to calculate the image displacement amount.

The phase difference AF processing unit 135 is also a defocus amount calculation unit that calculates the defocus amount in the focusing direction of the photographic lens 101 on the basis of the image displacement amount that has been detected. The defocus amount is calculated by multiplying the image displacement amount by a factor (conversion factor). The image displacement amount calculation unit and the defocus amount calculation unit operate according to commands of the main CPU 151.

Alternatively, at least a part of these operations may be performed by the main CPU 151 or the focus control unit 133.

The phase difference AF processing unit 135 outputs the calculated defocus amount to the focus control unit 133. The focus control unit 133 determines the drive amount for driving the focus motor 132 on the basis of the defocus amount in the focusing direction of the photographic lens 101.

The movement control on the focus lens 131 by the focus control unit 133 and the focus motor 132 controls the AF.

The image data output from the imaging signal processing unit 142 is transmitted to an imaging control unit 143, so that it is temporarily accumulated in RAM 154 (random access memory). The image data accumulated in the RAM 154 is compressed by an image compression extraction unit 153 and then stored in an image recording medium 157.

In parallel with this, the image data accumulated in the RAM 154 is transmitted to an image processing unit 152. The image processing unit 152 processes image signals obtained by using sum signals of the first photoelectric conversion element and the second photoelectric conversion element.

The image processing unit 152, for example, increases/decreases the image data to an optimal size. The image data in the optimal size is transmitted to a monitor display 150, so that the image is presented.

This enables an operator to observe the captured image in real time. The monitor display 150 presents the captured image for a predetermined time period immediately after the capturing of the image, so that the operator can check the captured image.

An operation unit 156 (operation switch) is used by an operator to instruct the image capturing apparatus 100. Operation instruction signals input from the operation unit 156 are transmitted via the bus 160 to the main CPU 151.

The imaging control unit 143 controls the image sensor according to an instruction from the main CPU 151.

In advance of this, the main CPU 151 determines the accumulation time period for the image sensor 141, a gain setting value for outputting from the image sensor 141 to the imaging signal processing unit 142, and an aperture value for the lens unit on the basis of two pieces of information.

The two pieces of information described above refer to an instruction input from the operation unit 156 by an operator and the size of pixel signals in the image data temporarily accumulated in the RAM 154.

The imaging control unit 143 receives instructions on the accumulation time period and the gain setting value from the main CPU to control the image sensor 141.

A battery 159 is managed properly by a power management unit 158 to supply stable power to the entire image capturing apparatus 100. A flash memory 155 stores control programs for the operation of the image capturing apparatus 100.

Upon the operation by the operator to activate the image capturing apparatus 100 (upon the transition from the power OFF state to the power ON state), the control programs stored in the flash memory 155 are read (loaded) in a part of the RAM 154.

The main CPU 151 controls the operation of the image capturing apparatus 100 according to the control programs loaded in the RAM 154.

Figure 2:
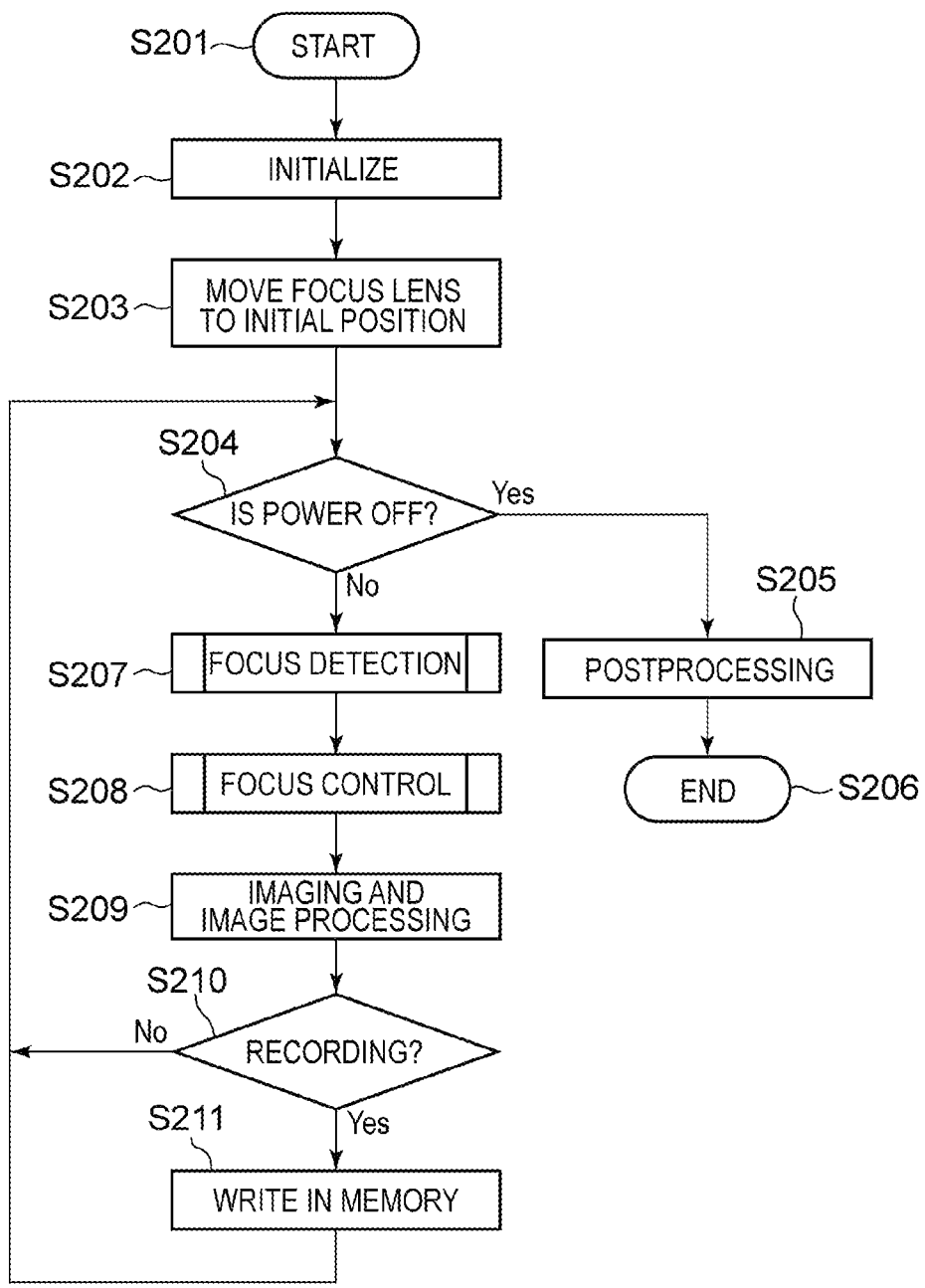
FIG. 2 is a flowchart of an operation of the image capturing apparatus according to the embodiment.

With reference to FIG. 2, the operation including focus control (focus adjustment) of the image capturing apparatus 100 will be now described. FIG. 2 is a flowchart of the operation of the image capturing apparatus 100. Each step in FIG. 2 is performed on the basis of a command of the main CPU 151.

In step S201 when the power to the image capturing apparatus 100 is turned on, the main CPU 151 starts calculation (control).

In step S202, flags and control variables of the image capturing apparatus 100 are initialized. In step S203, the optical components including the focus lens 131 are moved to their initial positions.

In step S204, the main CPU 151 detects whether an operator has operated to turn off power (detects the presence of the power off operation). If the power off operation is detected in step S204, the flowchart proceeds to step S205.

In step S205, the main CPU 151 moves the optical components to their initial positions and performs postprocessing, such as clearing flags and control variables, in order to turn off the power to the image capturing apparatus 100. In step S206, the processing (control) of the image capturing apparatus 100 is finished.

If, in step S204, the power off operation is not detected, the flowchart proceeds to step S207. In step S207, the main CPU 151 performs focus detection processing.

Subsequently, in step S208, the focus control unit 133 drives the focus lens 131 in accordance with the driving direction, speed, and position determined in step S207, so that the focus lens 131 is moved to a desired position.

In step S209, the image sensor 141 performs the photoelectric conversion on a subject image (imaging processing). Additionally, the imaging signal processing unit 142 performs predetermined processing (image processing) on the subject image, which has been subjected to the photoelectric conversion, and outputs image signals.

In step S210, the main CPU 151 determines whether the operator has pressed a recording button (the operation unit 156) to check whether recording is in process. If no recording is in process, the flowchart reverts back to step S204.

If recording is in process, the flowchart proceeds to step S211. In step S211, the image signals (image data) output from the imaging signal processing unit 142 are compressed by the image compression extraction unit 153 and stored in the image recording medium 157. The flowchart reverts back to step S204 to repeat the steps described above.

Figure 3A:
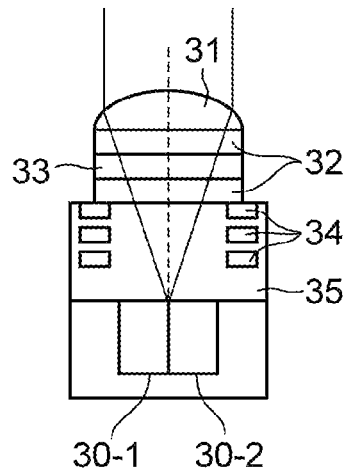
FIGS. 3A, 3B, and 3C are diagrams for describing an image sensor having pixels with a focus detection function according to the embodiment.
Figure 3B:
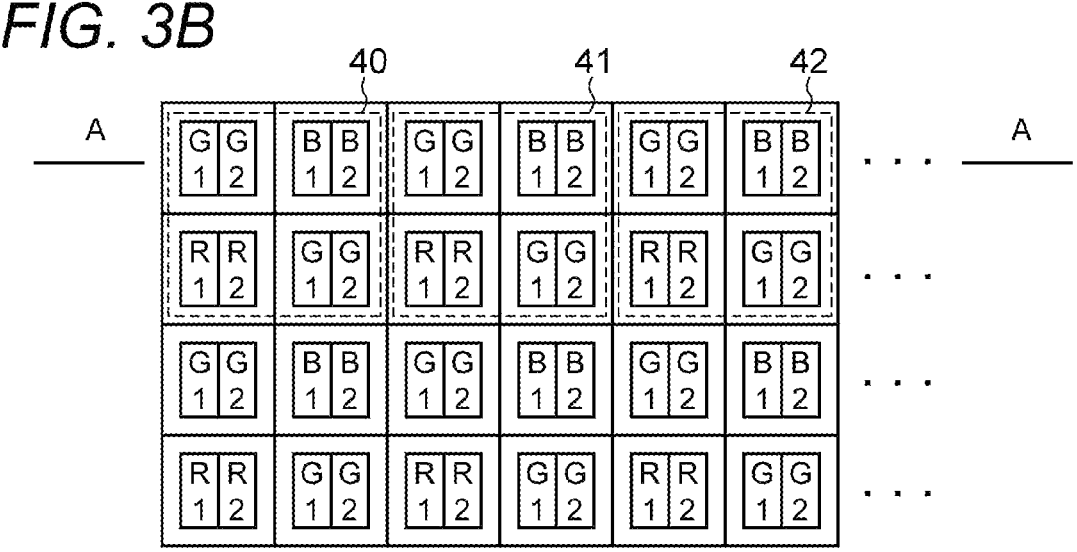
Figure 3C:
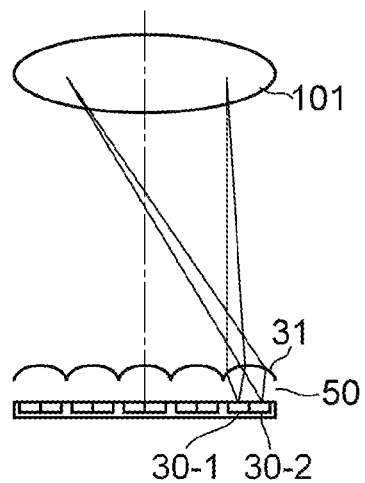

A phase difference detection method according to the embodiment will now be described. With reference to FIGS. 3A, 3B, and 3C, the configuration of the image sensor 141 will be described first. FIG. 3A is a configuration diagram (sectional view) of a pixel in the image sensor 141 having the pupil-dividing function.

A photoelectric conversion element 30 is divided into two per pixel, namely a photoelectric conversion element 30-1 (the first photoelectric conversion element) and a photoelectric conversion element 30-2 (the second photoelectric conversion element), to have the pupil-dividing function.

A micro lens 31 (on-chip micro lens) has a function to collect light efficiently onto the photoelectric conversion element 30 and is positioned so that the optical axis falls on the boundary between the photoelectric conversion elements 30-1 and 30-2. Additionally, the one pixel includes planarizing films 32, a color filter 33, wiring lines 34, and an interlayer insulation film 35.

FIG. 3B is a configuration diagram (plan view) of a part of the image sensor 141. The image sensor 141 is formed with an array of pixels each having the configuration illustrated in FIG. 3A.

For the capturing of an image, the focus detection pixels including the color filters 33 of R (red), G (green), and B (blue) are disposed alternately, so that pixel blocks 40, 41, and 42 each including four pixels are arranged to form a Bayer array.

In FIG. 3B, the numbers "1" or "2" shown under R, G, or B indicates the photoelectric conversion element 30-1 or 30-2.

FIG. 3C is a diagram of optical principle for the image sensor 141, in a sectional view obtained along the line A-A in FIG. 3B. The image sensor 141 is positioned on a predetermined image-forming plane of the photographic lens 101.

By the action of the micro lens 31, the photoelectric conversion elements 30-1 and 30-2 each receive one beam from a pair of light beams. These two light beams have passed through the pupil (exit pupil) of the photographic lens 101 at different positions (regions).

The photoelectric conversion element 30-1 mainly receives the light beam passing through the pupil of the photographic lens 101 at a position toward the right in FIG. 3C. The photoelectric conversion element 30-2 mainly receives the light beam passing through the pupil of the photographic lens 101 at a position toward the left in FIG. 3C.

Figure 4:
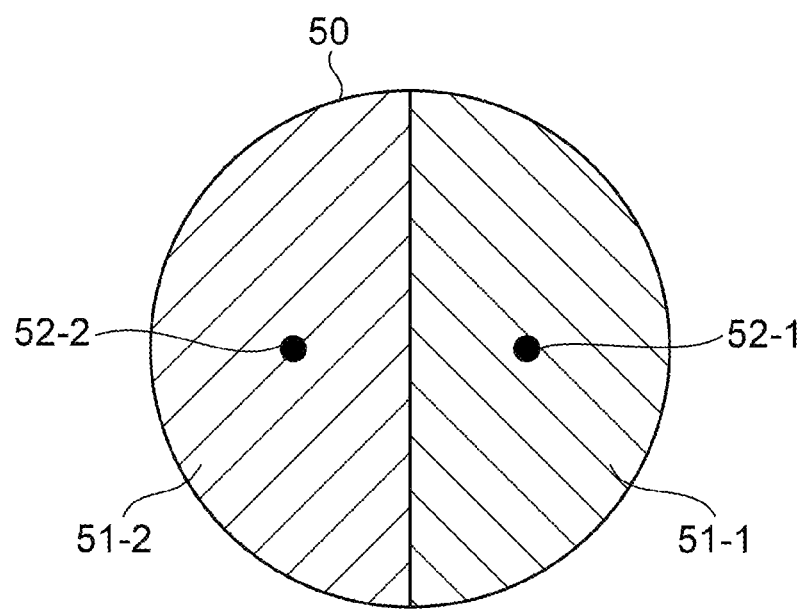
FIG. 4 is a diagram of a pupil of a photographic lens according to the embodiment.

With reference to FIG. 4, the pupil of the image sensor 141 will now be described. FIG. 4 is a diagram illustrating a pupil 50 of the photographic lens 101 as observed from the image sensor 141.

A sensitive region 51-1 (hereinafter referred to as "image A pupil") is for the photoelectric conversion element 30-1; a sensitive region 51-2 (hereinafter referred to as "image B pupil") is for the photoelectric conversion element 30-2. The positions 52-1 and 52-2 represents the centers of gravity of the image A pupil and the image B pupil, respectively.

To perform the imaging processing according to the embodiment, an image signal can be generated by adding outputs from the two photoelectric conversion elements located within an identical pixel including an identical-color color filter.

To perform the focus detection processing according to the embodiment, a focus detection signal of one pixel is obtained through summation of outputs from the photoelectric conversion elements 30-1 within one pixel block.

By, then, obtaining such a signal sequentially in a lateral direction, such as the pixel blocks 40, 41, and 42, a signal of image A can be generated. Through summation of outputs from the photoelectric conversion elements 30-2 within one pixel block, a focus detection signal of one pixel is obtained in a similar manner.

By, then, obtaining such a signal sequentially in the lateral direction, a signal of image B can be generate. With the signal of image A and the signal of image B, a pair of phase difference detection signals are generated.

Figure 5:
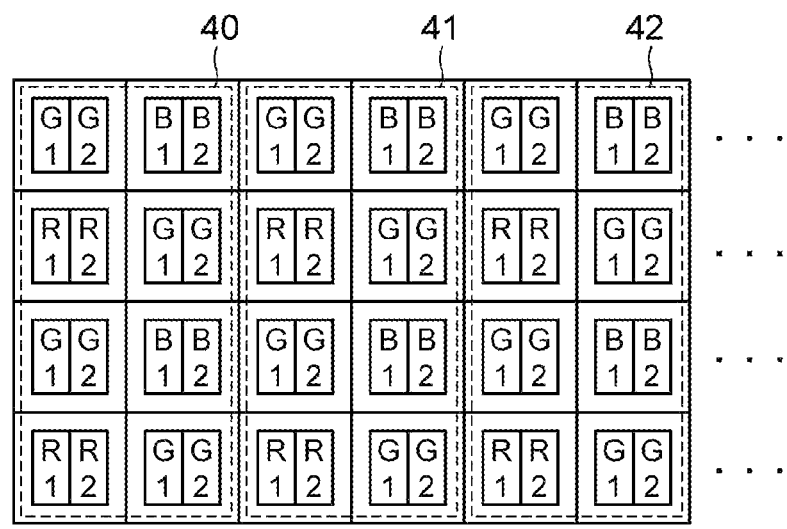
FIG. 5 is a diagram for describing pixel line addition in a focus detection region according to the embodiment.

In this embodiment, outputs from the pixels are added in a longitudinal direction of the figure in an appropriate range (hereinafter referred to as pixel line addition) as illustrated in FIG. 5, and the result is obtained as one pixel signal of the signal of image A or the signal of image B.

In the example illustrated in FIG. 5, an image signal for use in the focus detection is generated by adding and averaging outputs of two pixels in the Bayer array in the longitudinal direction (hereinafter referred to as two line addition). A method for setting the pixel line addition count will be described in detail hereinafter.

Figure 6A:
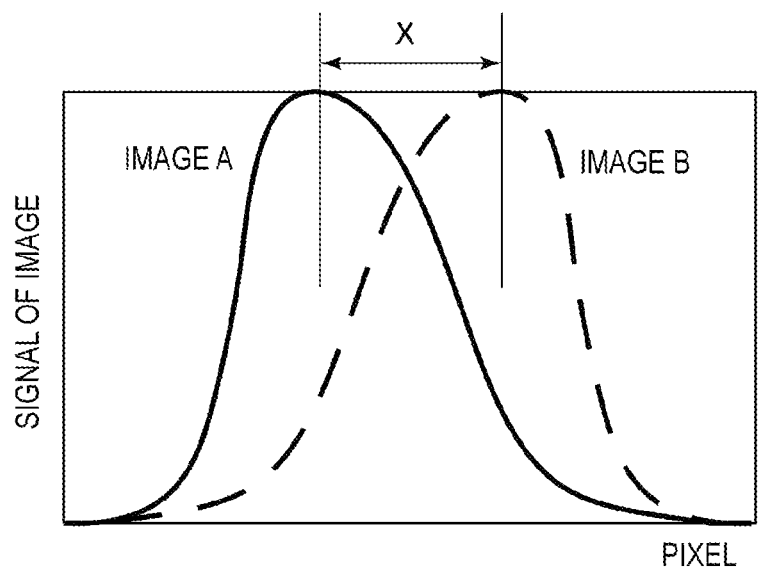
FIGS. 6A and 6B are graphs for describing signals of images and correlation calculation thereof according to the embodiment.
Figure 6B:
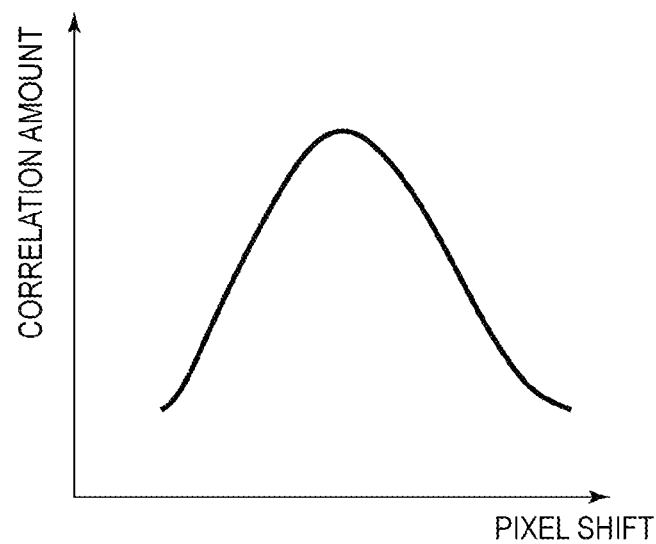

With reference to FIGS. 6A and 6B, the signal of image A and the signal of image B (hereinafter collectively referred to as "signals of the images") will be described. FIG. 6A is a graph for describing the signals of the images, with the vertical axis representing the level of the signals of the images and the horizontal axis representing the pixel position.

The generated pair of phase difference detection signals have an image displacement amount X that varies with the focus state of the photographic lens 101 (in focus, focus being in front of the subject, or focus being behind the subject). If the photographic lens 101 is in the in-focus state, the two signals of the images have no image displacement amount. If the focus is in front of the subject or behind the subject, the image displacement amount will be in different directions.

Furthermore, the image displacement amount has a certain relationship with a distance from the position at which the subject image is formed through the photographic lens 101 to the upper surface of the micro lens, i.e., the defocus amount.

The correlation calculation is performed to calculate the image displacement amount X. In the correlation calculation, the correlation amount is calculated with pixels of the signal of image A and the signal of image B being shifted. FIG. 6B is a graph of the correlation amount (hereinafter referred to as correlation amount waveform) obtained with pixels of the signals of the images being shifted.

In FIG. 6B, the horizontal axis represents the shift amount of pixels and the vertical axis represents the correlation amount between the signal of image A and the signal of image B. The difference between the positions at which the correlation amount reaches its maximum is calculated as the image displacement amount. When the correlation amount is calculated, the two signals of the images are overlaid to compare corresponding signals and thereby obtain the total of the smaller values.

Alternatively, the total of the larger values may be obtained. Furthermore, the difference between these values may be obtained. The totals serve as indicators of the correlation. The total of the smaller values reaches its maximum when there is a high correlation.

The total of the larger values or the difference between these values reaches its minimum when there is a high correlation.

Figure 7:
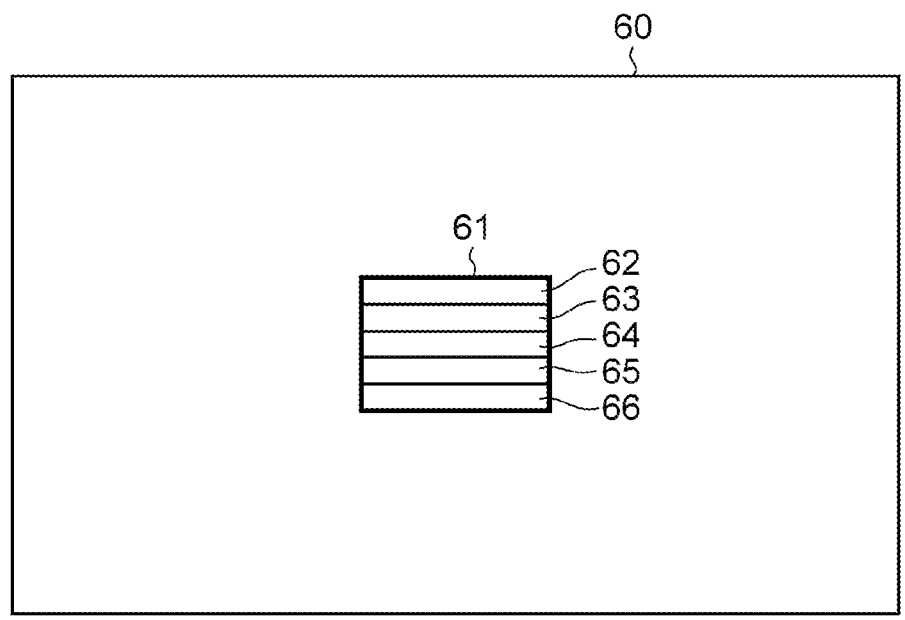
FIG. 7 is a diagram of a focus detection region according to the embodiment.

With reference to FIG. 7, a focus detection region for use in a focus detection method according to the embodiment will be described. FIG. 7 is a diagram of the focus detection region. As illustrated in FIG. 7, a focus detection region 61 in an appropriate size is provided at an appropriate position in an imaging angle of view 60.

The focus detection region 61 includes focus detection segments 62 to 66, which are formed through segmentation of the focus detection region 61 in the longitudinal direction of the figure. The pixel line addition and the correlation calculation are performed for the region in each of these focus detection segments 62 to 66.

By performing the correlation calculation in all the segments, the correlation amount waveforms, as illustrated in FIG. 6B, are obtained in a quantity equal to the number of segments. By adding the correlation amount waveforms in the quantity equal to the number of segments (hereinafter referred to as correlation amount addition), a final correlation amount waveform in the focus detection region 61 is obtained. The image displacement amount X where the correlation amount reaches its maximum is calculated from this correlation amount waveform in the focus detection region 61.

The number of segments can be the number of pixel lines included in the focus detection region 61 at maximum. By using the number of segments, the ratio of a pixel line addition count to a correlation amount addition count in the focus detection region 61 can be controlled. A method of controlling the ratio of the pixel line addition count to the correlation amount addition count will be described in detail hereinafter.

Figure 8:
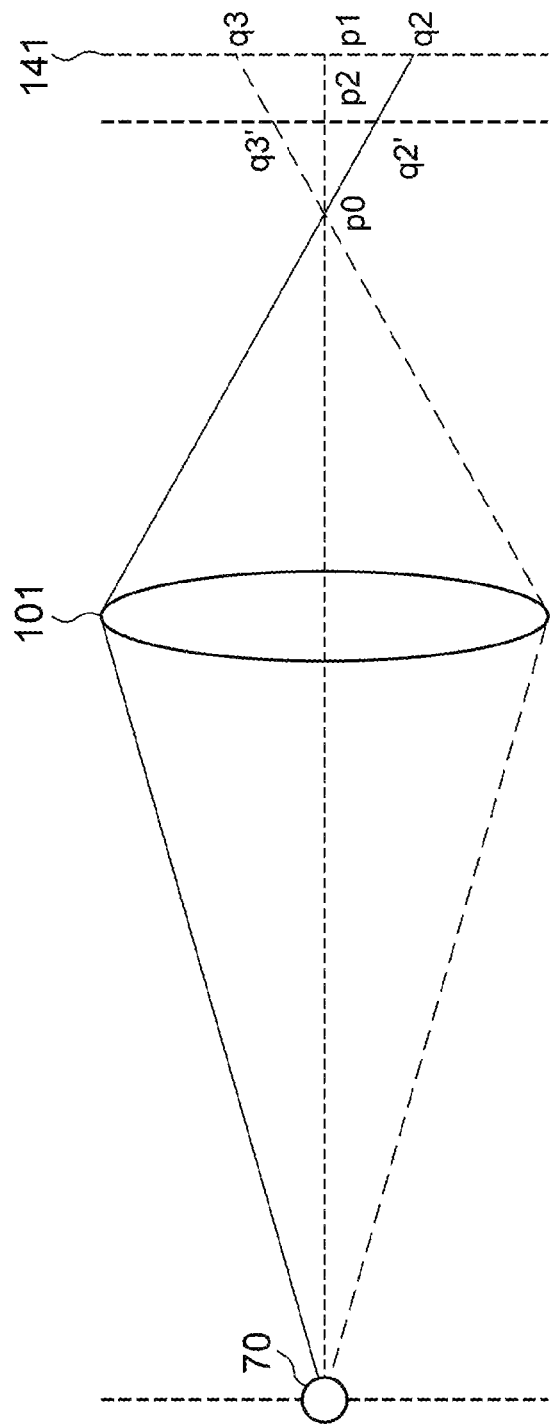
FIG. 8 is a diagram for describing an optical module and its function according to the embodiment.

With reference to FIG. 8, the conversion from the image displacement amount calculated through the correlation calculation to the defocus amount will be described. FIG. 8 is a diagram illustrating the optical module including the photographic lens 101 and the image sensor 141. For a subject 70, an optical axis OA passes through a predetermined image-forming plane at a position p0 to reach a focus detection plane at a position p1. The relationship between the image displacement amount and the defocus amount is dependent on the optical module.

The defocus amount can be calculated by multiplying the image displacement amount X by a predetermined factor K (conversion factor).

The factor K is calculated on the basis of the positions of the centers of gravity of the image A pupil and the image B pupil. When the position p1 of the focus detection plane moves to a position p2, the image displacement amount changes with the similarity between a triangle of positions p0, q2, and q3 and a triangle of positions p0, q2', and q3'. Thus, the defocus amount at the focus detection plane at the position p2 can be calculated.

The main CPU 151 calculates the position of the focus lens 131 to achieve the in-focus state on the subject, on the basis of the defocus amount.

The main CPU 151 functions as a focus adjustment unit that performs the focus adjustment of the phase difference type by using focus detection signals output from the image sensor.

The focus detection pixel line addition count and the correlation amount addition count according to the embodiment will now be described in detail. The image sensor according to the embodiment is controlled on the basis of exposure setting values suitable for the image capturing because the image sensor outputs signals for use in both of the focus detection unit and the image capturing unit.

When an exposure target value is small in relation to the dynamic range of the pixels, image signals for use in the focus detection are small, which may increase noise. As a result, variation in the results of the focus detection is increased. In the case where an operator sets the exposure manually, changing the accumulation time period of the image sensor and the aperture of the lens may affect image signals for use in focus detection, which may hinder the focus detection.

When one pixel in the focus detection region is generated, noise in image signals for use in the focus detection can be reduced through the pixel line addition. In the case of a subject slanting in relation to the focus detection region, as in FIG. 9, increasing the pixel line addition count may reduce the resolution.

Figure 9:
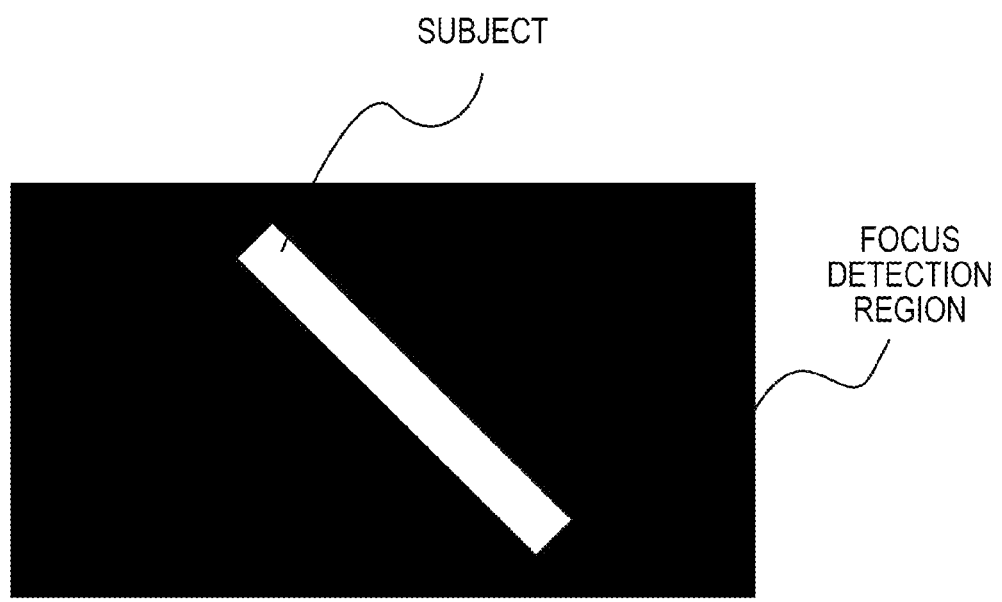
FIG. 9 is a diagram of an example subject slanting in relation to a focus detection region.

The variation in results of focus detection can be suppressed also through the correlation amount addition. By performing the correlation calculation in a range narrow in the longitudinal direction, a reduction in the resolution can be suppressed for a subject slanting in relation to the focus detection region as illustrated in FIG. 9.

This, however, may require that the correlation calculation be repeated to suppress the variation in results of the focus detection for a case with a subject with no contrast or for a case with significant noise in image signals, and thus the duration of the calculation may be increased.

In the present embodiment, the ratio of the focus detection pixel line addition to the correlation amount addition in the focus detection region is controlled in accordance with a subject. By detecting the contrast of a subject or a subject in the form of a slanting line and controlling the ratio of the pixel line addition to the correlation amount addition, noise is reduced and a balance is achieved between the duration of the calculation and the suppression of reduction in resolution.

Figure 10:
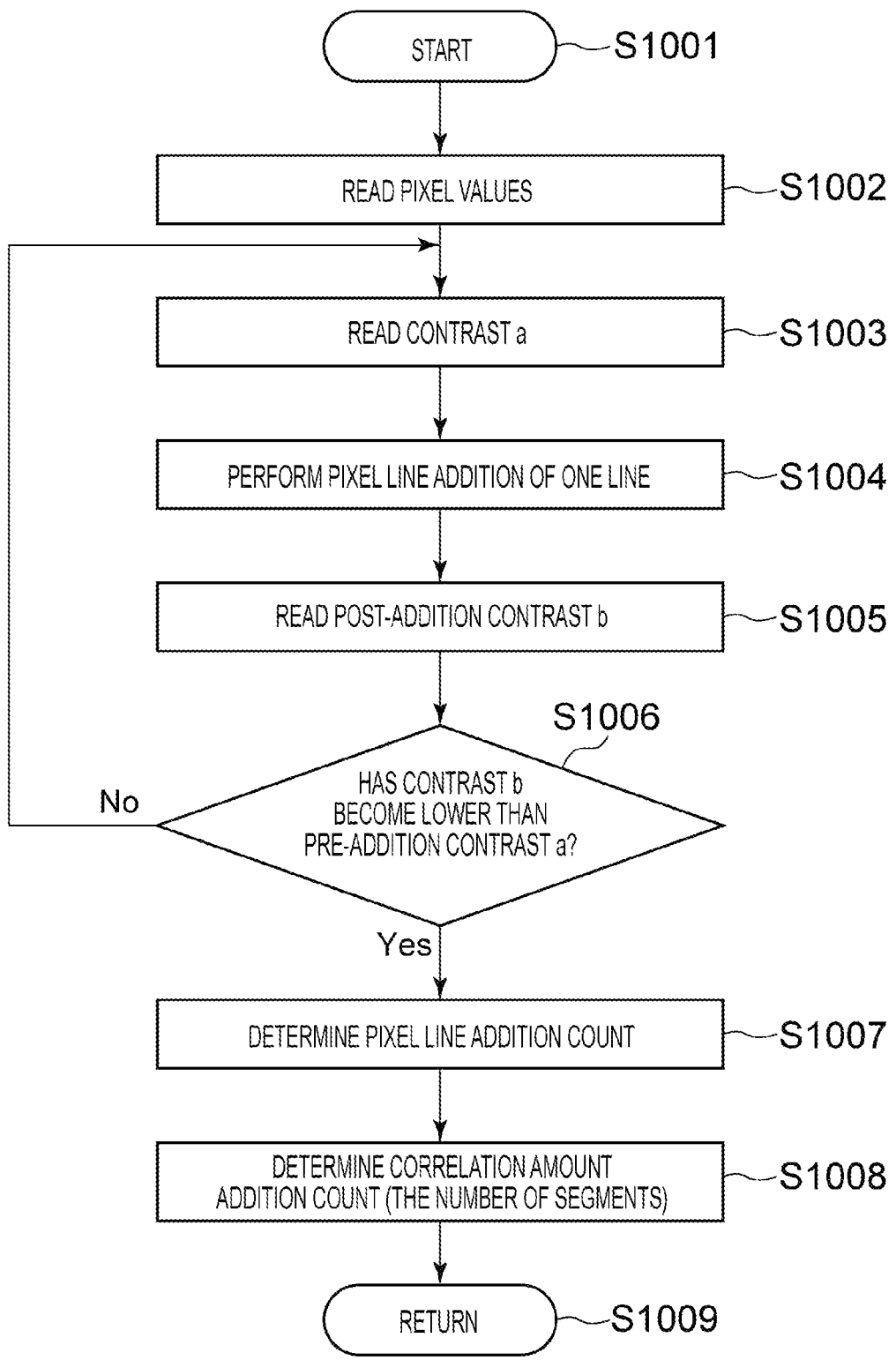
FIG. 10 is a flowchart of a method of setting an addition count according to the embodiment.

FIG. 10 is a flowchart of a method of setting the pixel line addition count and the correlation amount addition count in a focus detection region according to the embodiment. Each step in FIG. 10 is performed by the main CPU 151. In step S1001, the setting of the pixel line addition count and the correlation amount addition count is started.

In step S1002, pixel values are read from the focus detection region 61. As pixel values to be read, pixel values that have been accumulated for the current frame on which the focus detection is to be performed may be used, or pixel values stored from the previous frame may be used.

In step S1003, contrast is calculated (hereinafter referred to as contrast a) with pixel values from the first one line, out of the pixel values that have been obtained. The square of an adjacent difference of pixel values is calculated, and the total of the square for the one line in the focus detection region is calculated to provide an indicator for the contrast.

Note that the contrast calculated may be the sum of absolute values of adjacent differences of pixel values.

Subsequently, in step S1004, the pixel line addition of the next one line to the first one line is performed and averaged. In step S1005, post-pixel-line-addition contrast (hereinafter referred to as contrast b) is calculated.

While the method in which one line is added at a time has been described in this embodiment, any predetermined number of lines may be added, such as two lines and three lines. In step S1006, the contrast b is compared to the contrast a to determine whether the post-addition contrast b has a larger value than the pre-addition contrast a.

If the value is larger, the flowchart reverts back to step S1003 to repeat the process from step S1003 to step S1006 to perform the pixel line addition until the contrast b becomes lower than the contrast a. When the contrast b becomes lower than the contrast a, the flowchart proceeds to step S1007, where the number of times the pixel line addition has been performed up to the current moment is determined as the pixel line addition count.

For a subject slanting in relation to the focus detection region as in FIG. 9, for which the resultant signals of the images become degraded as the pixel line addition proceeds, the determination is possible through the contrast calculation.

If the post-pixel-line-addition contrast does not become lower than the pre-pixel line addition contrast, the subject does not slant and thus a larger pixel line addition count is set. If it becomes lower, the subject slants, and a smaller pixel line addition count is set.

Note that, in S1006, the range in which the contrast b becomes lower than the contrast a may have a tolerance. Furthermore, the pixel line addition count may have an upper limit or a lower limit.

In step S1008, by dividing the number of pixel lines included in the focus detection region 61 by the pixel line addition count determined in step S1007, the number of segments and the correlation amount addition count in the focus detection region 61 are determined.

In step S1009, the process in this flowchart is finished. In the manner described above, the pixel line addition count and the correlation amount addition count, i.e., their ratio, can be set in accordance with a subject by using the image information from the current or previous frame.

Figure 11:
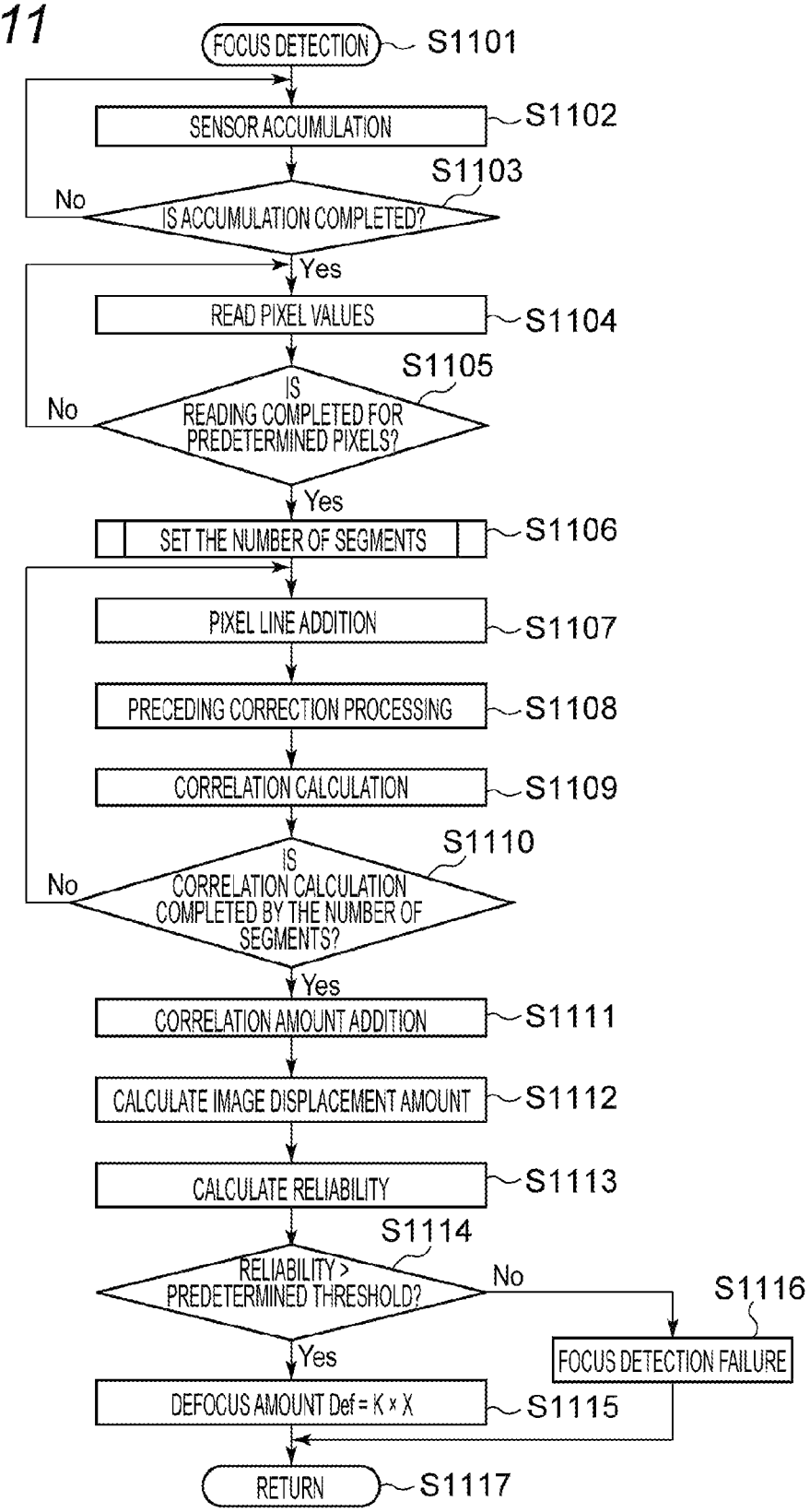
FIG. 11 is a flowchart of a focus detection method according to the embodiment.

With reference to FIG. 11, the focus detection method according to the embodiment will now be described. FIG. 11 is a flowchart of the focus detection method. The steps in FIG. 11 are performed by the main CPU 151, the phase difference AF processing unit 135, or the focus control unit 133. These steps correspond to step S207 in FIG. 2.

In step S1101, the focus detection is started. In step S1102, the image sensor 141 accumulates electric charges by receiving light beams that have passed through different pupil regions in an imaging optical system. In step S1103, the main CPU 151 determines whether the accumulation of electric charges has been completed.

If the electric charge accumulation ending time of the image sensor 141 has not been reached, the flowchart reverts back to step S1102, where the image sensor 141 continues to accumulate electric charges. If, in step S1103, the accumulation of electric charges has been completed, then, in step S1104, pixel values of image signals in the focus detection region are read.

In step S1105, the main CPU 151 determines whether the reading has been completed by a predetermined number of pixels present in the focus detection region. If the reading is not completed by the predetermined number of pixels, the flowchart reverts back to step S1104 to continue reading the pixel values until the reading of the predetermined number of pixels is completed (YES in S1105).

In step S1106, the number of segments is set as described in FIG. 10. In step S1107, the pixel line addition is performed for the first one of the focus detection segments illustrated in FIG. 7, on the basis of the number of segments that has been set. In step S1108, the focus control unit 133 performs preceding correction processing on the obtained signals of the images.

The preceding correction processing includes correction on the signals of the images that have been read, and filtering on the signals of the images, such as averaging filtering and edge enhancement filtering. In step S1109, the main CPU 151 (the focus control unit 133 or the phase difference AF processing unit 135) performs the correlation calculation to obtain a correlation amount waveform as illustrated in FIG. 6B.

In step S1110, it is determined whether the correlation calculation has been performed by the number of segments. If the correlation calculation is not completed by the number of segments, the flowchart reverts back to step S1107 to perform the correlation calculation for the next focus detection segment. Steps S1107 to S1110 are then repeated until the correlation calculation is completed for all the focus detection segments included in the focus detection region 61.

If, in step S1110, it is determined that the correlation calculation has been performed by the number of segments, then, in step S1111, the correlation amount addition is performed. Subsequently, in step S1112, the shift amount at which the correlation reaches its maximum is calculated from the correlation amount resulting from the addition to calculate the image displacement amount.

Note that the calculation of the image displacement amount includes interpolation using a correlation value with the shift amount at the maximum correlation and shift amounts before and after the maximum, to obtain an interpolated value within one shift. The sum of the shift amount and the interpolated value is the image displacement amount X.

As described above, the main CPU 151, the focus control unit 133, or the phase difference AF processing unit 135, which serves as the image displacement amount calculation unit, performs the correlation calculation with signal values independently obtained from the first photoelectric conversion element and the second photoelectric conversion element to calculate the image displacement amount.

Subsequently, in step S1113, the main CPU 151 (the focus control unit 133 or the phase difference AF processing unit 135) evaluates the reliability of the image displacement amount X that has been calculated. The reliability is calculated on the basis of the contrast of the signals of the images, the agreement of the two signals of the images, or other image parameters.

In step S1114, the main CPU 151 (the focus control unit 133 or the phase difference AF processing unit 135) determines whether the reliability is larger than a predetermined threshold (whether a reliable image displacement amount X has been obtained).

If the reliability is larger than the predetermined threshold, then, in step S1115, the main CPU 151 multiplies the calculated image displacement amount X by a post-correction factor K (through a relation of Def=K×X) to obtain the defocus amount Def.

In step S1117, the focus detection processing described in this flowchart is completed. If, in step S1114, the reliability is equal to or smaller than the predetermined threshold (a reliable image displacement amount has not been detected), then, in step S1116, the focus detection is not performed (failure of the focus detection). The process described in this flowchart is completed in step S1117, and the operation of the apparatus continues according to the flowchart of FIG. 2.

Figure 12:
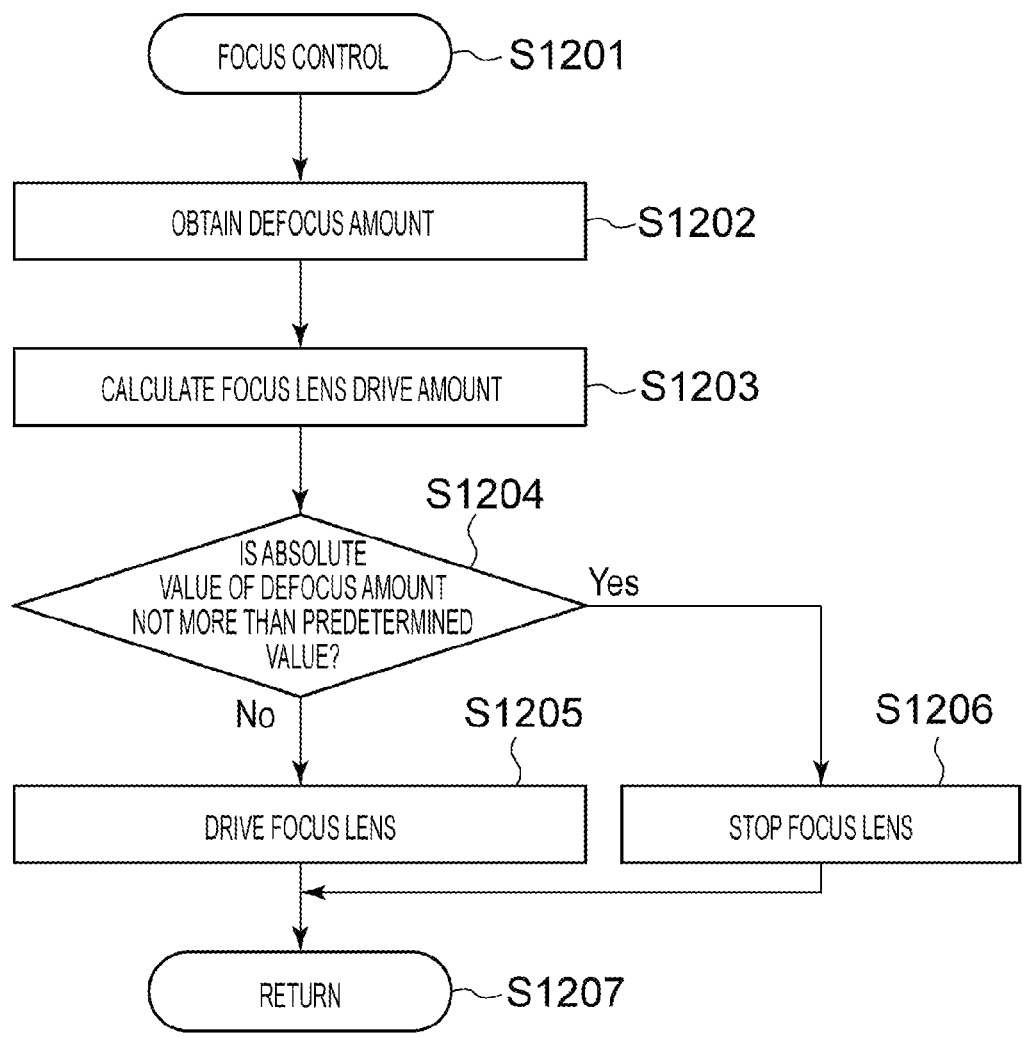
FIG. 12 is a flowchart of a focus control method according to the embodiment.

With reference to FIG. 12, a focus control method (focus adjustment method) according to the present invention will now be described. FIG. 12 is a flowchart of the focus control method according to the embodiment. When the focus control method of the embodiment is started, the main CPU 151 performs predetermined calculation.

The focus control unit 133 then controls the focus motor 132 on the basis of the command of the main CPU 151. The steps in FIG. 12 are performed by the main CPU 151 and the focus control unit 133. These steps correspond to step S208 in FIG. 2.

In step S1201, the focus control is started. In step S1202, the focus control unit 133 obtains the defocus amount calculated through the focus detection method described in FIG. 11.

In step S1203, the focus control unit 133 calculates the drive amount (lens drive amount) of the focus lens 131 on the basis of the defocus amount. The calculation of the lens drive amount also includes the calculation of the lens driving direction and speed. In step S1204, the main CPU 151 (the focus control unit 133) determines whether the absolute value of the defocus amount is not more than a predetermined value.

The main CPU 151 functions as an addition ratio change unit that changes the ratio of the number of focus detection pixel lines to the number of correlation amounts greater than one.

The main CPU 151 functions as a correlation amount calculation unit that performs the correlation calculation for each of the focus detection pixels to obtain the correlation amount.

The main CPU 151 functions as a correlation amount addition unit that adds correlation amounts calculated by the correlation amount calculation unit.

The main CPU 151 functions as the image displacement amount calculation unit that calculates the image displacement amount by using an output signal output from the correlation amount addition unit.

The main CPU 151 functions as the defocus amount calculation unit that calculates the defocus amount on the basis of the image displacement amount.

The main CPU 151 functions as a subject recognition unit that detects information on the subject on the basis of an output signal of the image sensor.

The main CPU 151 changes the above-described ratio on the basis of the result of the previous focus detection performed with the focus detection signals output from the image sensor.

If, in step S1204, the absolute value of the defocus amount is more than the predetermined value, the flowcharts proceeds to step S1205. In step S1205, since the position of the focus lens 131 is not deemed to be the in-focus position (the focal point), the focus lens 131 is driven according to the lens drive amount calculated in step S1203. After the position of the focus lens 131 is driven to the in-focus position, the flowchart proceeds to step S1207.

Subsequently, the focus detection and the driving of the focus lens are repeated according to the flowchart described in FIG. 2.

If, in step S1204, the absolute value of the defocus amount is not more (less) than the predetermined value, the flowchart proceeds to step S1206. In step S1206, since the focus lens position is deemed to be at the in-focus position, the driving of the lens is stopped. Thereafter, the flowchart proceeds to step S1207.

Then, the focus detection is performed according to the flowchart described in FIG. 2. If the defocus amount exceeds the predetermined value again, the focus lens 131 is driven.

As described in the flowchart in FIG. 2, the image capturing apparatus 100 repeats the procedures described in FIGS. 10, 11, and 12 to perform the focus detection more than once until the subject is in focus, before the power for moving the focus lens is turned off. The focus detection performed for the second time and beyond can use subject information from the previous focus detection to control the ratio of the pixel line addition to the correlation amount addition.

Furthermore, since the subject image obtained from the image sensor 141 becomes sharper as the focus lens position approaches the in-focus position, the improvement of the ratio of the pixel line addition to the correlation amount addition to make it more suitable for the subject can be facilitated.

While, in the embodiment, the method of calculating contrast for setting the ratio of the pixel line addition to the correlation amount addition on the basis of the pixel values obtained from the image sensor 141 has been described, similar calculation may be performed on the basis of pixel values obtained from an auto exposure (AE) sensor which is not shown in FIG. 1.

The main CPU 151 functions as a subject recognition unit that detects information on the subject on the basis of an output signal output from the exposure sensor.

As described above, in the present embodiment, the ratio of the pixel line addition to the correlation amount addition in a focus detection region is controlled in accordance with subject information. Thus, the focus detection can be performed with suppressed reduction in resolution for a subject slanting in relation to a focus detection region and with suppressed noise in an image signal.

Second Embodiment

A method of controlling the ratio of the focus detection pixel line addition to the correlation amount addition in a focus detection region according to a second embodiment of the present invention will now be described. In the first embodiment, the method of comparing contrast as the pixel line addition is performed with one line at a time by using image information from the current frame or the previous frame has been described. In the present embodiment, a method of setting the focus detection pixel line addition count and the correlation amount addition count in a focus detection region on the basis of edge detection and subject contrast will be described.

Components similar to those in the first embodiment are designated with similar reference signs in this embodiment, and their descriptions are omitted.

A main CPU 151 functions as a subject recognition unit that detects information on a subject on the basis of an output signal output from an exposure sensor.

The main CPU 151 determines that the subject slants in relation to a focus detection region set on an imaging plane of an image sensor if the relative positional displacement amount from any focus detection pixel lines at least not less than two in the focus detection region is larger than a predetermined value.

If it is determined that the subject slants in relation to the focus detection region, the main CPU 151 sets a large number of correlation amounts greater than one.

Figure 13:
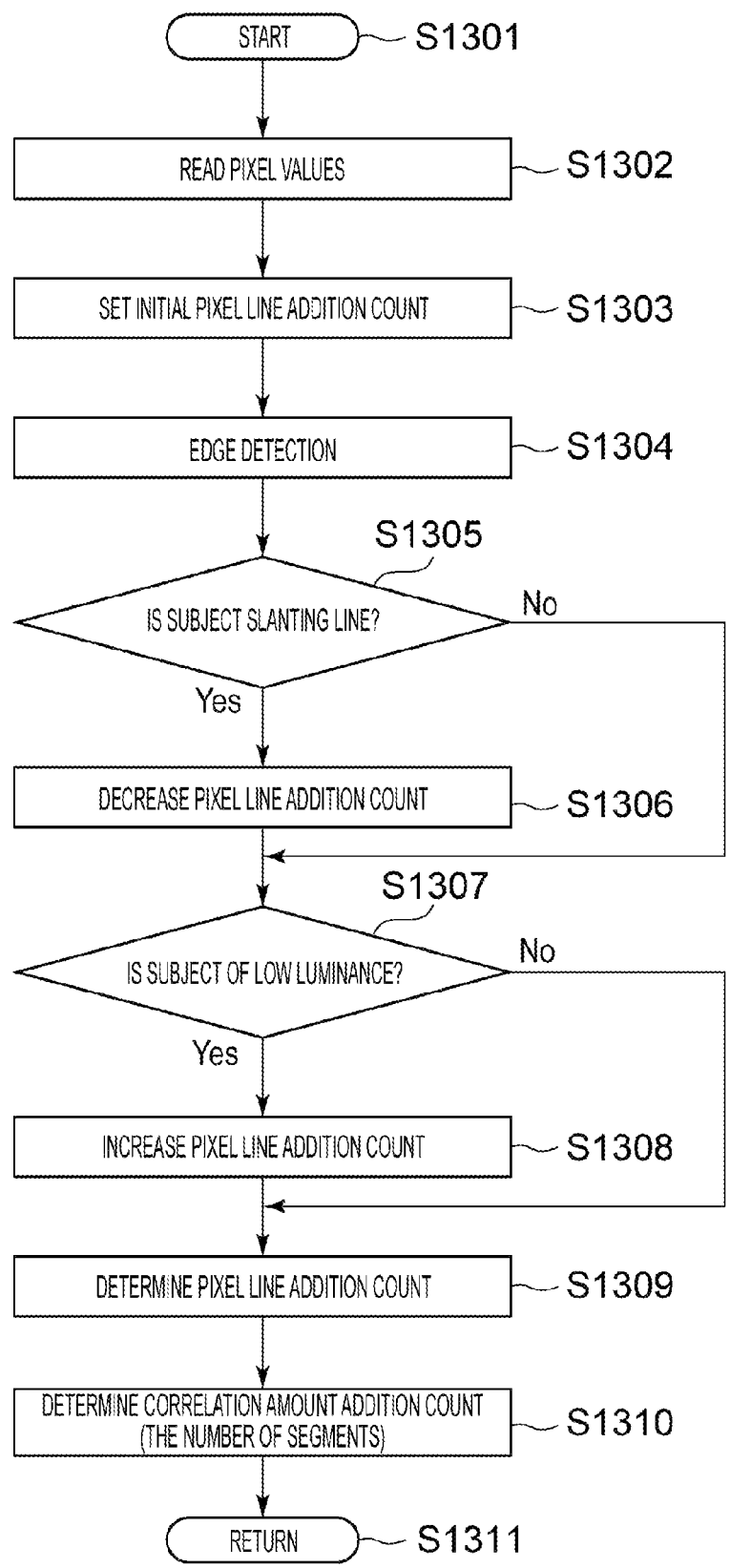
FIG. 13 is a flowchart of a method of setting an addition count according to a second embodiment.

FIG. 13 is a flowchart of the method of setting the focus detection pixel line addition count and the correlation amount addition count in the focus detection region according to the embodiment. Each step in FIG. 13 is performed by the main CPU 151.

In step S1301, the setting of the pixel line addition count and the correlation amount addition count is started. In step S1302, pixel values are read from a focus detection region 61. As pixel values to be read, pixel values that have been accumulated for the current frame on which the focus detection is to be performed may be used, or pixel values stored from the previous frame may be used.

Furthermore, an output from an AE sensor that is disposed separately from an image sensor 141 and includes a plurality of pixels may be used. In step S1303, an initial pixel line addition count is set. In the embodiment, eight lines are set as the initial line addition count.

In step S1304, edge detection is performed. The edge detection can be performed by selecting any two lines in the focus detection region 61 and performing the correlation calculation between the image signals of the two lines to obtain the relative positional displacement amount between the two lines.

If the subject is perpendicular in relation to the focus detection region 61, the relative positional displacement amount between the two lines is zero. If the subject slants in relation to the focus detection region 61, there will be some relative positional displacement amount between the two lines.

Subsequently, in step S1305, it is determined whether the calculated relative positional displacement amount is more than a predetermined value to determine whether the subject slants in relation to the focus detection region 61. If it is determined that the subject slants, then, in step S1306, the pixel line addition count is decreased (e.g., halved) before the flowchart proceeds to step S1307.

If it is determined that the subject does not slant, the pixel line addition count is unchanged before the flowchart proceeds to step S1307.

In step S1307, the contrast in the focus detection region 61 is calculated, and it is determined whether the contrast is more than a predetermined value to determine whether the subject is of low luminance. If it is determined that the subject is of low luminance, then, in step S1308, the pixel line addition count is increased (e.g., doubled) before the flowchart proceeds to step S1309.

If it is determined that the subject is not of low luminance, the pixel line addition count is unchanged before the flowchart proceeds to step S1309. The procedures in step S1309 and beyond are similar to those in step S1007 and beyond in the first embodiment described with reference to FIG. 10.

As described above, in this embodiment, the ratio of the pixel line addition to the correlation amount addition in a focus detection region is controlled through the edge detection and the determination of the contrast of a subject. Thus, the focus detection can be performed with suppressed reduction in resolution for a subject slanting in relation to the focus detection region and with suppressed noise in an image signal.

Note that the method of the edge detection in step S1304 is not limited to the correlation calculation with any lines in the focus detection region 61 and that pixel positions indicating the peaks of lines can be simply compared. Furthermore, the use of the focus detection region 61 is not limiting, and a result of the subject recognition unit on an imaging angle of view 60 may be used.

Values in the embodiment are presented as examples. While the setting is increased and decreased by doubling and halving the pixel line addition count in the description above, the pixel line addition count may be increased and decreased through addition and subtraction, for example, by adding or subtracting five lines or any other number of pixel lines equal to or greater than one.

Additionally, any initial value may be used in accordance with the structure of an image sensor or the model of an image capturing apparatus on which the image sensor is to be mounted. Moreover, in S1306, the pixel line addition count may be increased or decreased in accordance with the relative positional displacement amount, which is a result of the edge detection.

While the line addition used in the method described above is by addition and averaging, the embodiment is not limited thereto. In the case where a resultant signal from the addition is less than a predetermined value, simple addition (without averaging) may be used.

In the embodiments described above, the ratio of the pixel line addition to the correlation amount addition in a focus detection region is controlled in accordance with subject information. In this manner, a focus detection device, an image capturing apparatus, an imaging system, and a focus detection method thereof are provided that are highly precise and capable of performing the focus detection with increased resolution for a subject slanting in relation to the focus detection region and with suppressed noise in an image signal.

While some preferred embodiments of the present invention have been described, the present invention is not limited to these embodiments and various changes and modifications are possible within the scope of its spirit.

The present invention provides a focus detection device, an image capturing apparatus, and an imaging system that are highly precise and capable of performing the focus detection with suppressed reduction in resolution for a subject slanting in relation to a focus detection region and with suppressed noise in an image signal, and a focus detection method thereof.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-093891, filed Apr. 30, 2014, which is hereby incorporated by reference herein in its entirety.

What is claimed is:

1. An image capturing apparatus, comprising:
   an image sensor including focus detection pixels each including photoelectric converters that receive a pair of light beams that have passed through different pupil regions in an imaging optical system;
   a focus adjustment unit configured to perform focus adjustment of a phase difference type by using focus detection signals output from the image sensor;
   a pixel addition unit configured to add focus detection signals output every line of at least one focus detection pixel line of the focus detection pixels of the image sensor, the at least one focus detection pixel line being arrayed in a first direction, the pixel addition unit being configured to add the focus detection signals in a second direction that is different from the first direction;
   a correlation amount calculation unit configured to perform correlation calculation on the focus detection signals added in the second direction to obtain a correlation waveform value;
   a correlation amount addition unit configured to add correlation waveform values calculated by the correlation amount calculation unit;
   an addition ratio change unit configured to change the number of focus detection pixel lines to be subjected to the addition in the second direction and change the number of correlation waveform values, based on information about a subject; and
   an image displacement amount calculation unit configured to calculate an image displacement amount by using an output signal output from the correlation amount addition unit.

2. The image capturing apparatus according to claim 1, further comprising a subject recognition unit configured to detect information on the subject on a basis of an output signal output from an exposure sensor, wherein the addition ratio change unit changes the number of focus detection pixel lines to be subjected to the addition in the second direction and changes the number of correlation waveform values, on a basis of an output signal output from the subject recognition unit.

3. The image capturing apparatus according to claim 1, further comprising a subject recognition unit configured to detect information on the subject on a basis of an output signal of the image sensor, wherein the addition ratio change unit changes the number of focus detection pixel lines to be subjected to the addition in the second direction and changes the number of correlation waveform values, on a basis of an output signal output from the subject recognition unit.

4. The image capturing apparatus according to claim 3, wherein, in a case in which it is determined that first contrast is smaller than second contrast, the subject recognition unit determines that the subject slants in relation to a focus detection region set on an imaging plane of the image sensor, the first contrast being present when the number of focus detection pixel lines subjected to the addition at the pixel addition unit is more than a predetermined value, the second contrast being present when the number of focus detection pixel lines subjected to the addition at the pixel addition unit is not more than the predetermined value.

5. The image capturing apparatus according to claim 3, wherein, in a case in which a subject on any focus detection pixel lines at least not less than two in a focus detection region set on an imaging plane of the image sensor has a relative positional displacement amount more than a predetermined value, the subject recognition unit determines that the subject slants in relation to the focus detection region.

6. The image capturing apparatus according to claim 5, wherein, in a case in which the subject recognition unit determines that the subject slants in relation to the focus detection region, a number of correlation waveform values is increased.

7. The image capturing apparatus according to claim 1, wherein, in a case in which luminance in a focus detection region set on an imaging plane of the image sensor is lower than a predetermined value, the addition ratio change unit increases a number of focus detection pixel lines to be subjected to the addition in the second direction.

8. The image capturing apparatus according to claim 1, wherein the addition ratio change unit changes the number of focus detection pixel lines subjected to the addition in the second direction and changes the number of correlation waveform values on a basis of a result of previous focus detection performed with focus detection signals output from the image sensor.

9. The image capturing apparatus according to claim 1, wherein, while a focus detection region set on an imaging plane of the image sensor is kept constant in size, the addition ratio change unit changes the number of focus detection pixel lines subjected to the addition in the second direction and changes the number of correlation waveform values, on a basis of information on the subject.

10. An imaging method of an image capturing apparatus including an image sensor including focus detection pixels each including photoelectric converters that receive a pair of light beams that have passed through different pupil regions in an imaging optical system, the method comprising:

a focus adjustment step performing focus adjustment of a phase difference type by using focus detection signals output from the image sensor;

a pixel addition step adding focus detection signals output every line of at least one focus detection pixel line of the focus detection pixels of the image sensor, the at least one focus detection pixel line being arrayed in a first direction, the adding of the focus detection signals being performed in a second direction that is different from the first direction;

a correlation amount calculation step performing correlation calculation on the focus detection signals added in the second direction to obtain a correlation waveform value;

a correlation amount addition step adding correlation waveform values calculated in the correlation amount calculation step;

an addition ratio change step changing the number of focus detection pixel lines to be subjected to the adding in the second direction and change the number of correlation waveform values, on a basis of information on a subject; and an image displacement amount calculation step calculating an image displacement amount by using an output signal output from the correlation amount addition step.

* * * * *